(12) United States Patent
Noda et al.

(10) Patent No.: US 7,087,294 B2
(45) Date of Patent: Aug. 8, 2006

(54) BONDING BODY AND METHOD OF PRODUCING THE SAME

(75) Inventors: Ken-ichi Noda, Ichinomiya (JP); Tatsuo Kawaguchi, Gifu Pref. (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 10/095,290

(22) Filed: Mar. 11, 2002

(65) Prior Publication Data

US 2002/0187339 A1    Dec. 12, 2002

(30) Foreign Application Priority Data

Mar. 16, 2001  (JP)  ............... 2001-076022
Dec. 12, 2001  (JP)  ............... 2001-378199

(51) Int. Cl.
*B32B 7/02*  (2006.01)
*B32B 17/10*  (2006.01)

(52) U.S. Cl. ............... 428/212; 428/213; 428/336; 428/430

(58) Field of Classification Search ............... 428/212, 428/414, 418, 442, 213, 336, 430
See application file for complete search history.

(56) References Cited

U.S. PATENT DOCUMENTS

| 4,769,399 | A | | 9/1988 | Schenz |
| 4,902,574 | A | * | 2/1990 | Lee ............... 428/422 |
| 4,980,234 | A | | 12/1990 | Almer et al. |
| 4,983,672 | A | | 1/1991 | Almer et al. |
| 5,209,917 | A | * | 5/1993 | Ohno et al. ............... 423/594.8 |
| 5,707,409 | A | * | 1/1998 | Martin et al. ............... 51/295 |
| 6,002,515 | A | * | 12/1999 | Mizuuchi et al. ............... 359/326 |
| 6,156,434 | A | * | 12/2000 | Hayashi et al. ............... 428/421 |
| 6,470,125 | B1 | * | 10/2002 | Nashimoto et al. ............... 385/122 |
| 6,515,869 | B1 | * | 2/2003 | Funaya et al. ............... 361/768 |
| 6,545,791 | B1 | * | 4/2003 | McCaughan et al. ............... 359/245 |
| 6,571,026 | B1 | * | 5/2003 | Kondo et al. ............... 385/2 |
| 6,584,265 | B1 | * | 6/2003 | Kondo et al. ............... 385/129 |
| 6,670,445 | B1 | * | 12/2003 | Okuhira ............... 528/481 |

FOREIGN PATENT DOCUMENTS

| JP | 3-243185 | 10/1988 |
| JP | 2-1790 | 1/1990 |
| JP | 9-241340 A | 9/1997 |

OTHER PUBLICATIONS

Database WPI, Section Ch, Week 199124, Derwent Publications Ltd., London, GB; Class A21, AN 1991-175162, XP002228584 & JP 03 106918 A (Nitto Denko Corp), May 7, 1991 Abstract.

* cited by examiner

*Primary Examiner*—Rena Dye
*Assistant Examiner*—Lawrence Ferguson
(74) *Attorney, Agent, or Firm*—Burr & Brown

(57) ABSTRACT

A bonding body includes a first member, a second member and an adhesive layer arranged between the first member and the second member. In the bonding body, the adhesive layer is made of a resin composition having a fluorene skeleton and at least one of the first member and the second member has a thickness of not less than 0.1 μm and not more than 10 μm.

9 Claims, 3 Drawing Sheets $R^1 \sim R^4$ indicate respectively halogen atom, alkyl group or alkoxyl group, and, m, n, p and q indicate respectively integer number of 0~4

BONDING BODY AND METHOD OF PRODUCING THE SAME

BACKGROUND OF THE INVENTION (1) Field of the Invention

The present invention relates to a bonding body in which a first member and a second member are connected by means of adhesives, and particularly relates to a bonding body in which one or both of the first and second members is thin.

(2) Prior Art Statement

Generally, various types of bonding bodies in which the first member and the second member are connected by means of the adhesives are known. Moreover, various kinds of adhesives used for this purpose are also known. As the normal adhesives, epoxy resin, acrylate resin, polyurethane resin, polyimide resin and silicone resin are known.

Among the adhesives mentioned above, in order to obtain a bonding body in which one of or both of the members are very thin, it is necessary to control precisely a thickness of the adhesive layer and a thickness variation of the adhesive layer, and also it is necessary to exhibit a sufficient bonding strength. In the normal adhesives mentioned above, it is difficult to have these two properties i.e. a thickness controlling property and a sufficient strength.

For example, the epoxy resin exhibits a high bonding strength. However, if it is used as the adhesive layer, it generates a thickness variation of the adhesive layer since it has a large viscosity. Therefore, it is not possible to obtain the adhesive layer having a uniform thickness. In this case, when the member of the bonding body using the epoxy resin as the adhesive layer is ground or polished to have a thin member, there is a drawback such that a thickness variation of the member occurs. The acrylate resin forms the adhesive layer having a uniform thickness since it has a low viscosity. However, when the member of the bonding body using an acrylate resin is ground or polished to have a thin member, a fracture or a peel-off of the member occurs. Therefore, it is not possible to obtain the member having a thickness of not more than 10 μm. Moreover, when the members each having a different thermal expansion coefficient are connected by heat so as to harden them, there is also a drawback such that the bonding body is bent due to a stress generated from a thermal expansion coefficient difference of the members.

SUMMARY OF THE INVENTION

An object of the present invention is to eliminate the drawbacks mentioned above and to provide a bonding body and a method of producing the same, in which a preferred connection can be achieved without generating a peel-off of the member even if one of or both of the members are thin.

According to the invention, a bonding body comprises a first member, a second member and an adhesive layer arranged between the first member and the second member, wherein the adhesive layer is made of a resin composition having a fluorene skeleton and at least one of the first member and the second member has a thickness of not less than 0.1 μm and not more than 10 μm.

Moreover, according to the invention, a method of producing a bonding body having a first member, a second member and an adhesive layer arranged between the first member and the second member, wherein one of the first member and the second member has a thickness of not less than 0.1 μm and not more than 10 μm, comprises a step of connecting the first member and the second member by means of the adhesive layer made of a resin composition having a fluorene skeleton.

In a preferred embodiment of the invention, the bonding body is formed from optical parts, and particularly the members constituting the bonding body are lithium niobate, MgO doped lithium niobate and lithium tantalate. Moreover, the resin composition having a fluorene skeleton is an epoxy resin or an acrylate resin.

A feature of the invention is to obtain the bonding body in which one of or both of the members constituting the bonding body are extremely thin by using resin compositions having a fluorene skeleton as the adhesives. The resin composition having a fluorene skeleton has a high glass transition temperature Tg and a decomposition temperature. Among them, Tg is not less than 200° C. Therefore, it is possible to obtain the bonding body having an excellent heat resistance. If an optical single crystal or a glass is used for the member, it is possible to utilize the bonding body as an optical waveguide.

BRIEF DESCRIPTION OF THE DRAWINGS

For a better understanding of the invention, reference is made to the attached drawings, wherein.

DETAILED DESCRIPTION OF THE INVENTION

Figure 1:
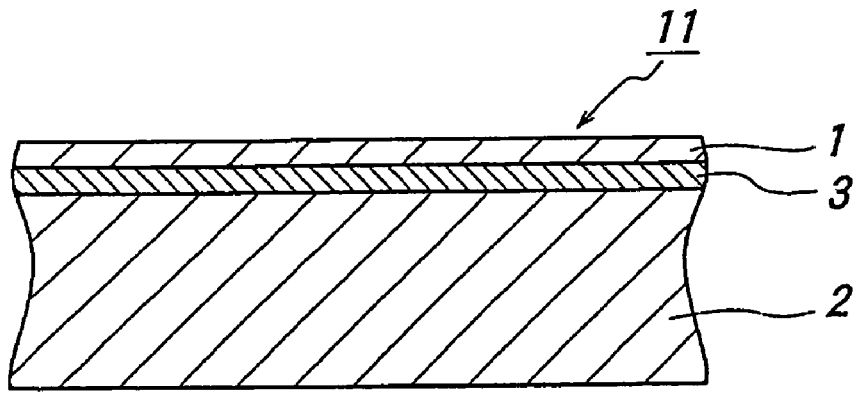
FIG. 1 is a schematic view showing one embodiment of a bonding body according to the invention.
Figure 2:
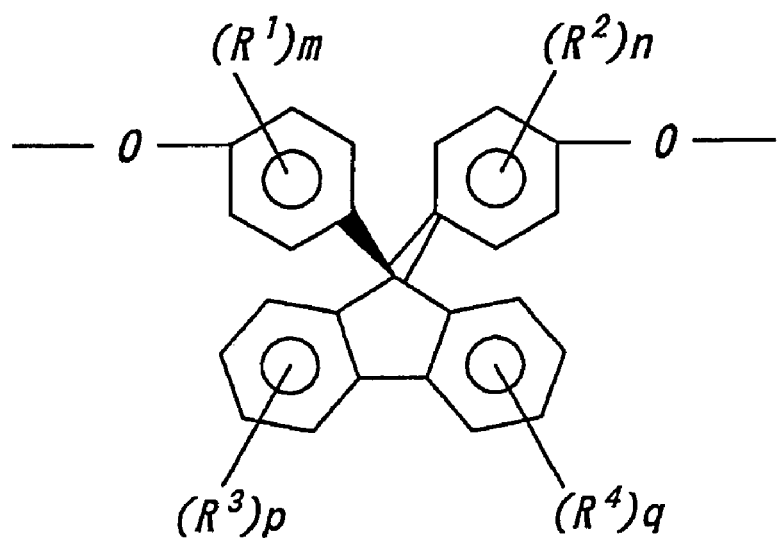
FIG. 2 is a schematic view illustrating a fluorene skeleton structure.

FIG. 1 is a schematic view showing one embodiment of a bonding body according to the invention. In the embodiment shown in FIG. 1, a bonding body 11 comprises a first member 1, a second member 2 and an adhesive member 3 arranged between the first member 1 and the second member 2. The adhesive layer 3 is constituted by a resin composition having a fluorene skeleton. Moreover, at least one of the first member 1 and the second member 2 (in the embodiment shown in FIG. 1, the first member 1 only) has a thickness of not less than 0.1 μm and not more than 10 μm.

In the bonding body 11 having the construction mentioned above, the resin having a fluorene skeleton can exhibit a sufficient bonding strength easily due to its specific resin composition. Moreover, the resin having a fluorene skeleton is hard and is not deformed by a stress generated during a thin working of the member. In addition, since the resin having a fluorene skeleton before hardening can be diluted by solvents, it is possible to control a viscosity of the resin to a predetermined value. Therefore, it is possible to control a thickness of the adhesive layer 3. In this manner, in the bonding body 11 connected by utilizing the fluorene skeleton resin, it is possible to perform a precise grinding or polishing so as to obtain the first member 1 and/or the second member 2 having a thickness of not more than 10 μm. Moreover, it is possible to reduce a bending of the bonding body 11 in which the members each having different thermal expansion coefficients are connected by heat so as to be hardened, by performing a grinding or polishing operation so as to obtain the first member 1 or the second member 2 constituting the bonding body 11 having a thickness of not more than 10 μm.

As a component of the adhesive layer 3, use may be made of any resins if they have a fluorene skeleton. As examples of resin compositions having a fluorene skeleton, use may be made of epoxy resin, acrylate resin, polyimide resin, polyamide resin, polysulfone resin, polyester resin and so on. Among them, it is particularly preferred to use an epoxy resin having a fluorene skeleton and an acrylate resin having a fluorene skeleton. Generally, epoxy and acrylate resins do not have a fluorene skeleton. In contrast, an effect of the present invention can be achieved by using specific epoxy and acrylate resins each having a fluorene skeleton.

Any materials and shapes can be used as the first member 1 and the second member 2. Moreover, use may be made of the structure having a preliminarily required shape or a material layer formed on the other material layer by a film forming method as the first member 1 and the second member 2. A thin working for the first member 1 and the second member 2 is not limited. Use may be made of grinding, lapping, polishing, slicing, sand blasting, RIE, ion trimming, etching by acid or alkali, and so on.

A bonding method between the first member 1 and the second member 2 and a hardening method of the adhesives are not particularly limited. As the bonding method, use may be made of a method in which the adhesives are dropped on the member and the other member is pressed to the member via the adhesives, a method in which the adhesives are coated on the member by a spin coating method or a dip coating method and the other member is pressed to the member via the adhesives, and a method in which the members are arranged in a face to face state and the adhesives are inserted into a space between the members. In order to maintain a necessary bonding state, it is preferred to perform a preliminary hardening under such a condition that the members are pressed with each other before hardening the members with no pressing operation. However, it is also possible to perform the hardening under pressure, to perform the preliminary hardening with no pressure, and to perform the preliminary hardening with no pressure before the members are under pressure.

A thickness of the adhesive layer 3 is not particularly limited. A bonding strength is varied corresponding to a kind of the adhesives and a thickness of the adhesive layers. A value of the bonding strength to be required is also varied corresponding to the member and a method of working the member thin. For example, in the case that a bonding body is produced by connecting two lithium niobate single crystal substrates via an acrylate resin having a fluorene skeleton and one of the lithium niobate single crystal substrates is worked thin by the lapping method, it is preferred to set the bonding strength to not less than 60 kgf/cm². Therefore, in order to obtain a sufficient bonding strength in the case of working the lithium niobate single crystal substrate thin by the lapping method, it is preferred to set a thickness of the adhesive layer 3 to not less than 0.05 μm more preferably not less than 0.1 μm. Moreover, in order to work the members 1 and 2 thin precisely, it is preferred to minimize a thickness variation of the adhesive layer 3. As a method of reducing the thickness variation of the adhesive layer 3, for example, use may be made of a method in which a thickness of the adhesive layer 3 is made thin. In this case, it is preferred to control a thickness of the adhesive layer 3 to not more than 1 μm more preferably not more than 0.5 μm. In order to make a thickness of the adhesive layer 3 thin, use may be made of a method in which a pressure is applied during a bonding operation, a method in which a resin having a low viscosity is used, and a method in which these two methods mentioned above are combined. When a thickness of the adhesive layer 3 is not more than 1 μm under a pressure of not more than 3 kgf/cm², it is preferred to control a viscosity of the adhesive to not more than 200 cps, more preferably not more than 100 cps.

EXPERIMENTS

Hereinafter, actual examples will be explained.

Example 1

A peel-off state of the bonding body according to the invention was investigated. At first, an epoxy resin having a fluorene skeleton was prepared as the adhesive. Then, an X-cut lithium niobate substrate (first member) having a thickness of 1 mm and a dimension of 15 mm×15 mm and an X-cut lithium niobate substrate (second member) having a thickness of 1 mm and a dimension of 20 mm×20 mm were connected via the preparedadhesive.

As the epoxy resin having a fluorene skeleton, use was made of a cardo epoxy resin (V-259EH) manufactured by Nippon Steel Chemical Co., Ltd., a viscosity of which was controlled at 7 cps. After the first member and the second member were washed, a solution of the epoxy resin having a fluorene skeleton was dropped on the second member, and the first member was pressed to the second member via the adhesive. Then, after the thus bonded substrates were subjected to a preliminary hardening at 100° C. for 1 hour, the bonded substrates were hardened by heat at 200° C. for 1 hour so as to obtain the bonding body. A thickness of the adhesive layer of the bonding body was 0.1 μm. Then, the first member was ground and polished by a mechanical grinder and a polisher so as to obtain the first member having a thickness of 3 μm. A fracture and a peel-off of the first member were not detected. Moreover, the bonding body was further exposed at 121° C. for 96 hours under a high temperature/high humidity condition in which humidity was 100%, but no peel-off of the first member was detected.

Example 2

At first, an acrylate resin having a fluorene skeleton was prepared as the adhesive. Then, a Y-cut MgO doped lithium niobate substrate (first member) having a thickness of 1 mm and a dimension of 15 mm×15 mm and a Y-cut MgO doped lithium niobate substrate (second member) having a thickness of 1 mm and a dimension of 20 mm×20 mm were connected via the prepared adhesive.

As the acrylate resin having a fluorene skeleton, use was made of a cardo acrylate resin (V-259PA) manufactured by Nippon Steel Chemical Co., Ltd., a viscosity of which was controlled at 70 cps. After the first member and the second member were washed, a solution of the acrylate resin having a fluorene skeleton was dropped on the second member, and the first member was pressed to the second member via the adhesive. Then, after the thus bonded substrates were subjected to a preliminary hardening at 100° C. for 1 hour, the bonded substrates were hardened by heat at 200° C. for 1 hour so as to obtain the bonding body. A thickness of the adhesive layer of the bonding body was 0.2 μm. Then, the first member was ground and polished by a mechanical grinder and a polisher so as to obtain the first member having a thickness of 3 μm. A fracture and a peel-off of the first member were not detected. Moreover, the bonding body was further exposed at 121° C. for 96 hours under a high temperature/high humidity condition in which humidity was 100%, but no peel-off of the first member was detected.

Example 3

At first, an acrylate resin having a fluorene skeleton was prepared as the adhesive. Then, a Y-cut MgO doped lithium niobate substrate (first member) having a thickness of 0.5 mm and a dimension of 15 mm×15 mm and an X-cut lithium niobate substrate (second member) having a thickness of 1 mm and a dimension of 20 mm×20 mm were connected via the prepared adhesive.

As the acrylate resin having a fluorene skeleton, use was made of a cardo acrylate resin (V-259PA) manufactured by Nippon Steel Chemical Co., Ltd., a viscosity of which was controlled at 70 cps. After the first member and the second member were washed, a solution of the acrylate resin having a fluorene skeleton was dropped on the second member, and the first member was pressed to the second member via the adhesive. Then, after the thus bonded substrates were subjected to a preliminary hardening at 100° C. for 1 hour, the bonded substrates were hardened by heat at 200° C. for 1 hour so as to obtain the bonding body. A thickness of the adhesive layer of the bonding body was 0.2 µm. Then, the first member was ground and polished by a mechanical grinder and a polisher so as to obtain the first member having a thickness of 3 µm. A fracture and a peel-off of the first member were not detected. Moreover, the bonding body was further exposed at 121° C. for 96 hours under a high temperature/high humidity condition in which humidity was 100%, but no peel-off of the first member was detected.

Example 4

At first, an acrylate resin having a fluorene skeleton was prepared as the adhesive. Then, an X-cut lithium niobate substrate (first member) having a thickness of 0.5 mm and a dimension of 35 mm×35 mm and an X-cut lithium niobate substrate (second member) having a thickness of 1 mm and a dimension of 45 mm×45 mm were connected via the prepared adhesive.

As the acrylate resin having a fluorene skeleton, use was made of a cardo acrylate resin (V-259PA) manufactured by Nippon Steel Chemical Co., Ltd., a viscosity of which was controlled at 70 cps. After the first member and the second member were washed, a solution of the acrylate resin having a fluorene skeleton was dropped on the second member, and the first member was pressed to the second member via the adhesive. Then, after the thus bonded substrates were subjected to a preliminary hardening at 100° C. for 1 hour, the bonded substrates were hardened by heat at 200° C. for 1 hour so as to obtain the bonding body. A thickness of the adhesive layer of the bonding body was 0.3 µm. Then, the first member was ground and polished by a mechanical grinder and a polisher so as to obtain the first member having a thickness of 3 µm. A fracture and a peel-off of the first member were not detected. Moreover, the bonding body was further exposed at 121° C. for 96 hours under a high temperature/high humidity condition in which humidity was 100%, but no peel-off of the first member was detected.

Example 5

At first, an acrylate resin having a fluorene skeleton was prepared as the adhesive. Then, a Y-cut MgO doped lithium niobate substrate (first member) having a thickness of 0.5 mm and a dimension of 35 mm×35 mm and a Y-cut MgO doped lithium niobate substrate (second member) having a thickness of 1 mm and a dimension of 45 mm×45 mm were connected via the prepared adhesive.

As the acrylate resin having a fluorene skeleton, use was made of a cardo acrylate resin (V-259PA) manufactured by Nippon Steel Chemical Co., Ltd., a viscosity of which was controlled at 70 cps. After the first member and the second member were washed, a solution of the acrylate resin having a fluorene skeleton was dropped on the second member, and the first member was pressed to the second member via the adhesive. Then, after the thus bonded substrates were subjected to a preliminary hardening at 100° C. for 1 hour, the bonded substrates were hardened by heat at 200° C. for 1 hour so as to obtain the bonding body. A thickness of the adhesive layer of the bonding body was 0.3 µm. Then, the first member was ground and polished by a mechanical grinder and a polisher so as to obtain the first member having a thickness of 3 µm. A fracture and a peel-off of the first member were not detected. Moreover, the bonding body was further exposed at 121° C. for 96 hours under a high temperature/high humidity condition in which humidity was 100%, but no peel-off of the first member was detected.

Example 6

At first, an acrylate resin having a fluorene skeleton was prepared as the adhesive. Then, a Y-cut MgO doped lithium niobate substrate (first member) having a thickness of 0.5 mm and a dimension of 35 mm×35 mm and an X-cut lithium niobate substrate (second member) having a thickness of 1 mm and a dimension of 45 mm×45 mm were connected via the prepared adhesives.

As the acrylate resin having a fluorene skeleton, use was made of a cardo acrylate resin (V-259PA) manufactured by Nippon Steel Chemical Co., Ltd., a viscosity of which was controlled at 70 cps. After the first member and the second member were washed, a solution of the acrylate resin having a fluorene skeleton was dropped on the second member, and the first member was pressed to the second member via the adhesive. Then, after the thus bonded substrates were subjected to a preliminary hardening at 100° C. for 1 hour, the bonded substrates were hardened by heat at 200° C. for 1 hour so as to obtain the bonding body. A thickness of the adhesive layer of the bonding body was 0.3 µm. Then, the first member was ground and polished by a mechanical grinder and a polisher so as to obtain the first member having a thickness of 3 µm. A fracture and a peel-off of the first member were not detected. Moreover, the bonding body was further exposed at 121° C. for 96 hours under a high temperature/high humidity condition in which humidity was 100%, but no peel-off of the first member was detected.

Example 7

At first, an epoxy resin having a fluorene skeleton was prepared as the adhesive. Then, a Z-cut MgO doped lithium niobate substrate (first member) having a thickness of 0.5 mm and a dimension of 35 mm×35 mm and a Z-cut lithium niobate substrate (second member) having a thickness of 1 mm and a dimension of 45 mm×45 mm were connected via the prepared adhesive.

As the epoxy resin having a fluorene skeleton, use was made of a cardo epoxy resin (V-259EH) manufactured by Nippon Steel Chemical Co., Ltd., a viscosity of which was controlled at 5 cps. After the first member and the second member were washed, a solution of the epoxy resin having a fluorene skeleton was applied on the second member by a spin-coater rotated at 4000 rpm and then dried, and the first member was pressed to the second member via the adhesive. Then, after the thus bonded substrates were subjected to a preliminary hardening at 100° C. for 1 hour, the bonded substrates were hardened by heat at 200° C. for 1 hour so as to obtain the bonding body. A thickness of the adhesive layer of the bonding body was 0.4 µm. Then, the first member was ground and polished by a mechanical grinder and a polisher so as to obtain the first member having a thickness of 3 µm. A fracture and a peel-off of the first member were not detected. Moreover, the bonding body was further exposed at 121° C. for 96 hours under a high temperature/high humidity condition in which humidity was 100%, but no peel-off of the first member was detected.

Example 8

At first, an acrylate resin having a fluorene skeleton was prepared as the adhesive. Then, a Y-cut MgO doped lithium niobate wafer (first member) having a thickness of 1 mm and a diameter of 3 inches and an X-cut lithium niobate wafer (second member) having a thickness of 1 mm and a diameter of 3 inches were connected via the prepared adhesive.

As the acrylate resin having a fluorene skeleton, use was made of a cardo acrylate resin (V-259PA) manufactured by Nippon Steel Chemical Co., Ltd., a viscosity of which was controlled at 70 cps. After the first member and the second member were washed, a solution of the acrylate resin having a fluorene skeleton was dropped on the second member, and the first member was pressed to the second member via the adhesive. A pressure was gradually applied from a center portion to a peripheral portion of the member by using a silicone rubber disc, in which a center portion is expanded by 0.5 mm as compared with a peripheral portion, so that the connecting operation was performed under such a condition that a thickness of the adhesive layer was even. Then, after the thus bonded substrates were subjected to a preliminary hardening at 100° C. for 1 hour, the bonded substrates were hardened by heat at 200° C. for 1 hour so as to obtain the bonding body. A thickness of the adhesive layer of the bonding body was 0.4 µm. Then, the first member was ground and polished by a mechanical grinder and a polisher so as to obtain the first member having a thickness of 3 µm. A fracture and a peel-off of the first member were not detected. Moreover, the bonding body was further exposed at 121° C. for 96 hours under a high temperature/high humidity condition in which humidity was 100%, but no peel-off of the first member was detected.

Example 9

At first, an acrylate resin having a fluorene skeleton was prepared as the adhesive. Then, a Z-cut MgO doped lithium niobate wafer (first member) having a thickness of 1 mm and a diameter of 3 inches and a Z-cut lithium niobate wafer (second member) having a thickness of 1 mm and a diameter of 3 inches were connected via the prepared adhesive. In this connection, in order to remove residual adhesive material, one or more recesses each having a width of 100 µm and a depth of 20 µm were formed to a connection surface of the first member or the second member.

As the acrylate resin having a fluorene skeleton, use was made of a cardo acrylate resin (V-259PA) manufactured by Nippon Steel Chemical Co., Ltd., a viscosity of which was controlled at 70 cps. After the first member and the second member were washed, a solution of the acrylate resin having a fluorene skeleton was dropped on the second member, and the first member was pressed to the second member via the adhesive. Then, after the thus bonded substrates were subjected to a preliminary hardening at 100° C. for 1 hour, the bonded substrates were hardened by heat at 200° C. for 1 hour so as to obtain the bonding body. A thickness of the adhesive layer of the bonding body was 0.4 µm. Then, the first member was ground and polished by a mechanical grinder and a polisher so as to obtain the first member having a thickness of 3 µm. A fracture and a peel-off of the first member were not detected. Moreover, the bonding body was further exposed at 121° C. for 96 hours under a high temperature/high humidity condition in which humidity was 100%, but no peel-off of the first member was detected.

Example 10

At first, an acrylate resin having a fluorene skeleton was prepared as the adhesive. Then, a Y-cut MgO doped lithium niobate wafer (first member) having a thickness of 0.5 mm and a diameter of 3 inches and an X-cut lithium niobate wafer (second member) having a thickness of 1 mm and a diameter of 3 inches were connected via the prepared adhesive.

As the acrylate resin having a fluorene skeleton, use was made of a cardo acrylate resin (V-259PA) manufactured by Nippon Steel Chemical Co., Ltd., a viscosity of which was controlled at 5 cps. After the first member and the second member were washed, a solution of the acrylate resin having a fluorene skeleton was applied on the second member by a spin-coater rotated at 4000 rpm and then dried, and the first member was pressed to the second member via the adhesive. Then, after the thus bonded substrates were subjected to a preliminary hardening at 100° C. for 1 hour, the bonded substrates were hardened by heat at 200° C. for 1 hour so as to obtain the bonding body. A thickness of the adhesive layer of the bonding body was 0.4 µm. Then, the first member was ground and polished by a mechanical grinder and a polisher so as to obtain the first member having a thickness of 3 µm. A fracture and a peel-off of the first member were not detected. Moreover, the bonding body was further exposed at 121° C. for 96 hours under a high temperature/high humidity condition in which humidity was 100%, but no peel-off of the first member was detected.

Example 11

At first, an acrylate resin having a fluorene skeleton was prepared as the adhesive. Then, a Y-cut MgO doped lithium niobate wafer (first member) having a thickness of 0.5 mm and a diameter of 3 inches and a Y-cut MgO doped lithium niobate wafer (second member) having a thickness of 1 mm and a diameter of 3 inches were connected via the prepared adhesive.

As the acrylate resin having a fluorene skeleton, use was made of a cardo acrylate resin (V-259PA) manufactured by Nippon Steel Chemical Co., Ltd., a viscosity of which was controlled at 15 cps. After the first member and the second member were washed, a solution of the acrylate resin having a fluorene skeleton was dropped on the second member and the first member was overlapped on the second member. Then, the bonding body was rotated at 5000 rpm by using a spin-coater so as to extend the adhesive between the first member and the second member, so that a thickness of the adhesive layer became even. Then, after the thus bonded substrates were subjected to a preliminary hardening at 100°

C. for 1 hour, the bonded substrates were hardened by heat at 200° C. for 1 hour so as to obtain the bonding body. A thickness of the adhesive layer of the bonding body was 0.4 µm. Then, the first member was ground and polished by a mechanical grinder and a polisher so as to obtain the first member having a thickness of 3 µm. A fracture and a peel-off of the first member were not detected. Moreover, the bonding body was further exposed at 121° C. for 96 hours under a high temperature/high humidity condition in which humidity was 100%, but no peel-off of the first member was detected.

Example 12

The bonding bodies according to examples of the invention and the bonding bodies according to comparative examples were compared. Resins A–D mentioned below were used as in adhesives. As is the same as the example 1, an X-cut lithium niobate substrate (first member) having a thickness of 1 mm and a dimension of 15 mm×15 mm and an X-cut lithium niobate substrate (second member) having a thickness of 1 mm and a dimension of 20 mm×20 mm were connected via the adhesives so as to obtain the bonding body. The first member was ground by a lapping method. After the grinding, a thickness of the first member and a status of the first member were observed. The results are shown in the following Table 1. In Table 1, resin A shows a resin having a fluorene skeleton according to the examples of the invention, and resins B, C and D indicate respectively a resin having no fluorene skeleton according to the comparative example.

Kinds of resins to be used:
Resin A: manufactured by Nippon Steel Chemical Co., Ltd., cardo acrylate resin (V-259A);
Resin B: manufactured by NICHIBAN Co., Ltd., epoxy resin (araldite);
Resin C: manufactured by EPOXY TECHNOLOGY INC., epoxy resin (301-2); and
Resin D: manufactured by Ardel Co., Ltd., light hardening acrylate resin (A200).

TABLE 1

| Thickness of first member | Status of first member | | | |
| --- | --- | --- | --- | --- |
| (µm) | resin A | resin B | resin C | resin D |
| 50 | ○ | Δ | Δ | ○ |
| 30 | ○ | Δ | Δ | ○ |
| 10 | ○ | Δ | Δ | x |
| 5 | ○ | Δ | Δ | — |
| 3 | ○ | Δ | Δ | — |
| 1 | ○ | Δ | Δ | — |
| 0.5 | ○ | x | x | — |
| 0.3 | ○ | — | — | — |
| 0.1 | ○ | — | — | — |
| 0.05 | x | — | — | — |

○: fracture and peel-off of first member are not detected after polishing, and thickness of first member is even.
Δ: fracture and peel-off of first member are not detected after polishing, but thickness of first member is not even.
x: fracture and peel-off of first member are detected after polishing.
—: not examined From the results shown in Table 1, it was understood that, in the examples of the invention using resin A, a peel-off was not detected and a thickness was even down to 0.1 µm. On the other hand, it was understood that, in the comparative examples using resins B and C, a thickness of the first member was not even if it was 50 µm, and a peel-off was generated if it became not more than 0.5 µm. Moreover, it was understood that, in the comparative examples using resin D, a peel-off was generated even if it was 10 µm. From the results mentioned above, it was understood that the examples of the invention had a sufficient bonding strength as compared with the comparative example and thus the bonding body having an even and thin member could be obtained according to the invention.

Example 14

A relation between a thickness of the member and a deformation amount of the member due to thermal expansion coefficient difference was investigated in the bonding body according to the invention. Acrylate resin having a fluorene skeleton was prepared as the adhesive. Then, an X-cut lithium niobate substrate (first member) having a thickness of 1 mm and a dimension of 15 mm×15 mm and a lithium tantalate substrate (second member) of 27° off-cut Y surface (63° Z-cut) having a thickness of 0.35 mm and a dimension of 20 mm×20 mm were connected via the prepared adhesive. As the acrylate resin having a fluorene skeleton, use was made of a cardo acrylate resin (V-259PA) manufactured by Nippon Steel Chemical Co., Ltd., a viscosity of which was controlled at 70 cps. After the first member and the second member were washed, a solution of the acrylate resin having a fluorene skeleton was dropped on the second member, and the first member was pressed to the second member via the adhesive. Then, after the thus bonded substrates were subjected to a preliminary hardening at 100° C. for 1 hour, the bonded substrates were hardened by heat at 200° C. for 1 hour so as to obtain the bonding body.

Figure 3:
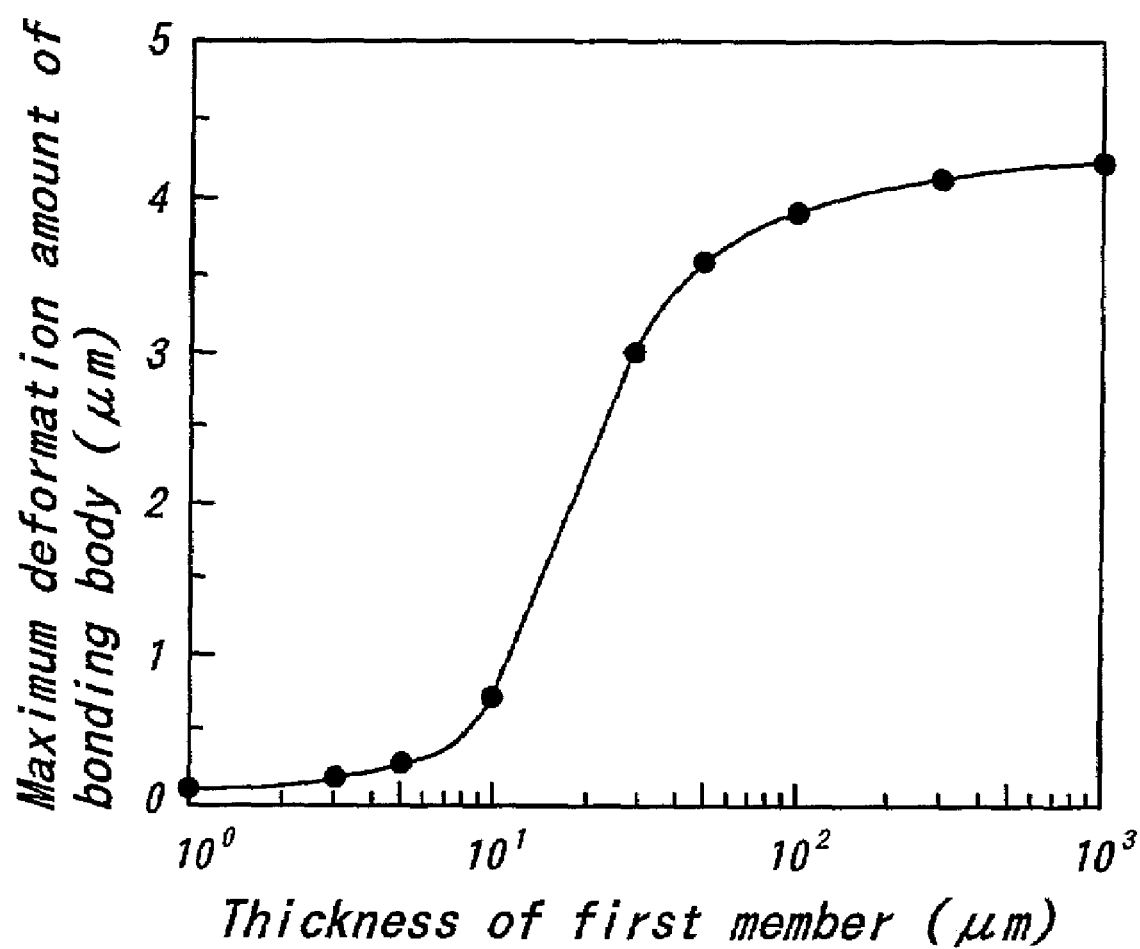
FIG. 3 is a graph depicting a relation in the bonding body according to the invention between a thickness of a member and a deformation amount of the bonding body due to a thermal expansion coefficient difference.

A thickness of the adhesive layer of the bonding body was 0.2 µm. A deformation was generated in the bonding body due to a thermal expansion coefficient difference between the first member and the second member. Then, the first member was ground and polished by a mechanical grinder and a polisher so as to make the first member thin. As a result, if a thickness of the first member became not more than 10 µm, a deformation amount of the bonding body was extraordinarily decreased. The results are shown in FIG. 3.

Example 15

A relation between a thickness of the member and a compression shear bonding strength was investigated in the bonding body according to the invention. As the acrylate resin having a fluorene skeleton, use was made of a cardo acrylate resin (V-259PA). Two X-cut lithium niobate single crystals each having a dimension of 15 mm×15 mm were connected as is the same as the example 1. In this case, a viscosity of the cardo acrylate resin was varied so as to vary a thickness of the adhesive layer. From the thus obtained bonding body, a sample having a dimension of 5 mm×5 mm was cut out, and a compression shear bonding strength of the cut-out sample was measured. The results are shown in FIG. 4.

Figure 4:
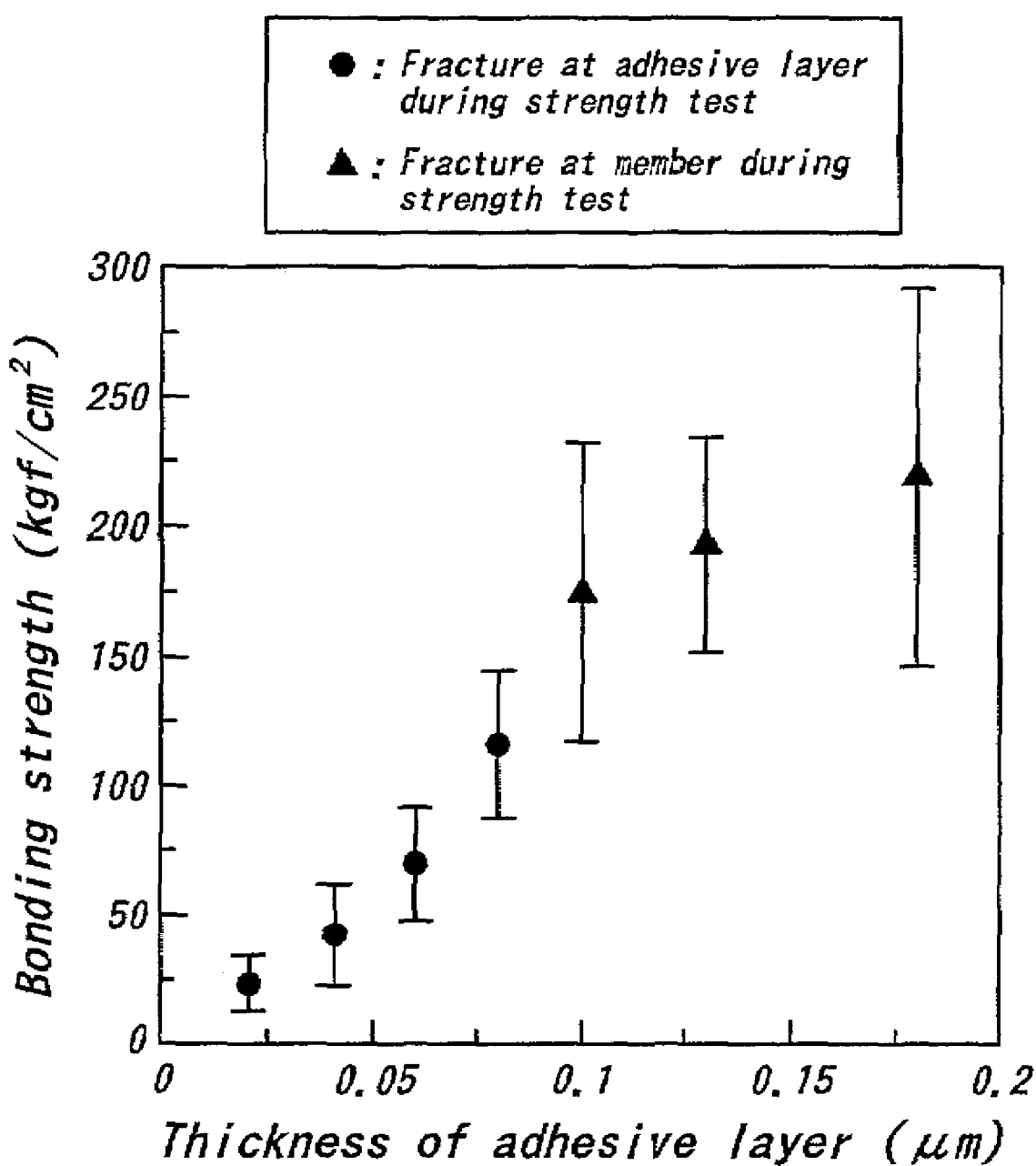
FIG. 4 is a graph showing a relation in the bonding member according to the invention between a thickness of an adhesive layer and a compression shear bonding strength.

From the results shown in FIG. 4, it is understood that a target bonding strength of not less than 60 kgf/cm$^2$ can be achieved if a thickness of the adhesive layer is not less than 0.05 µm. Moreover, since a substrate fracture range, which is not originated from the fracture of the adhesive layer, is not less than 0.1 µm, it is understood that a thickness of the adhesive layer is preferably not less than 0.1 µm.

From the results of the examples 1–14, in the bonding body according to the invention, it is understood that the bonding body, in which a sufficient bonding strength can be obtained and a thickness of the member is even and thin, can be obtained, if at least one of the first member and the second member is not less than 0.1 μm and not more than 10 μm. Moreover, from the results of the example 15, it is understood that a thickness of the adhesive layer of the bonding body is preferably not less than 0.05 μm more preferably not less than 0.1 μm.

As is clearly understood from the explanations mentioned above, according to the invention, since the first member and the second member are connected via the adhesives made of a resin having a fluorene skeleton, it is possible to obtain the bonding body having a sufficient bonding strength even if at least one of the members are thin so as to be not less than 0.1 μm and not more than 10 μm.

What is claimed is:

1. A bonding body comprising a first member, a second member and an adhesive layer arranged between the first member and the second member, wherein the adhesive layer is made of a resin composition having the following fluorene skeleton:

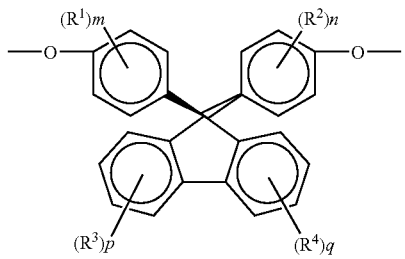

wherein $R^1$, $R^2$, $R^3$, and $R4^4$ each indicate at least one of a halogen atom, an alkyl group, and an alkoxyl group, and m, n, p and q each indicate an integer number of at least one of 0, 1, 2, 3, and 4; and wherein at least one of the first member and the second member is an optical part having a thickness of not less than 0.1 μm and not more than 10 μm and having a planar upper surface.

2. The bonding body according to claim 1, wherein the resin composition having the fluorene skeleton is one of an epoxy resin and an acrylate resin.

3. The bonding body according to claim 1, wherein the first member and the second member are lithium niobate.

4. The bonding body according to claim 1, wherein the first member and the second member are MgO doped lithium niobate.

5. The bonding body according to claim 1, wherein the first member is MgO doped lithium niobate and the second member is lithium niobate.

6. The bonding body according to claim 1, wherein the first member is lithium niobate and the second member is lithium tantalate.

7. The bonding body according to claim 1, wherein a thickness of said adhesive layer is not more than about 1 μm.

8. The bonding body according to claim 7, wherein the thickness of said adhesive layer is at least about 0.05 μm.

9. The bonding body according to claim 1, wherein both of said first and second members have substantially planar upper surfaces and said upper surface of said first member is substantially parallel to said upper surface of said second member.

* * * * *